(12) United States Patent
Yachin et al.

(10) Patent No.: US 10,380,576 B1
(45) Date of Patent: *Aug. 13, 2019

(54) SYSTEM AND METHOD FOR MANAGEMENT AND AUTOMATION OF INSTANT PURCHASE TRANSACTIONS

(71) Applicant: SLYCE CANADA INC., New Waterford (CA)

(72) Inventors: Avital Yachin, Bet Lehem Haglilit (IL); Andrey Petrenko, Hadera (IL)

(73) Assignee: Slyce Canada Inc., New Waterford (CA)

( * ) Notice: Subject to any disclaimer, the term of this patent is extended or adjusted under 35 U.S.C. 154(b) by 629 days.

This patent is subject to a terminal disclaimer.

(21) Appl. No.: 15/076,259

(22) Filed: Mar. 21, 2016

Related U.S. Application Data

(60) Provisional application No. 62/136,172, filed on Mar. 20, 2015, provisional application No. 62/136,205, filed on Mar. 20, 2015.

(51) Int. Cl.
| | |
|---|---|
| *G06Q 30/00* | (2012.01) |
| *G06Q 20/32* | (2012.01) |
| *G06Q 30/06* | (2012.01) |
| *G06Q 20/40* | (2012.01) |
| *G06Q 20/10* | (2012.01) |

(52) U.S. Cl.
CPC ....... *G06Q 20/3221* (2013.01); *G06Q 20/102* (2013.01); *G06Q 20/401* (2013.01); *G06Q 30/0601* (2013.01)

(58) Field of Classification Search
CPC .............................................. G06Q 30/06–08

USPC ................................................ 705/26.1–27.2
See application file for complete search history.

(56) References Cited

U.S. PATENT DOCUMENTS

| | | | |
|---|---|---|---|
| 8,160,959 | B2 | 4/2012 | Rackley, III et al. |
| 8,214,298 | B2 | 7/2012 | McCown |
| 2002/0052806 | A1* | 5/2002 | Hodson ................. G06Q 30/06 705/26.8 |
| 2003/0004822 | A1 | 1/2003 | Shorter et al. |

(Continued)

FOREIGN PATENT DOCUMENTS

WO        2015105717 A1      7/2015

*Primary Examiner* — Ethan D Civan
(74) *Attorney, Agent, or Firm* — Pillsbury Winthrop Shaw Pittman LLP

(57) ABSTRACT

A system and related method for completing online transactions via mobile device includes a client-side e-commerce platform executing on the mobile device that identifies candidate items for purchase based on images related to an item desired by the user. Purchase information for items offered by participating vendors is retrieved by the platform via APIs of the vendor network. Purchase information for items offered by third-party vendors outside the network is retrieved by a middleware platform called by the client-side platform. The user may select items for purchase and complete the transaction via single click, whereby the middleware forwards payment details to the third-party vendors and retrieves pricing, inventory, and purchase information (as well as authorization codes and records of the completed transaction) from the third-party vendors. The client-side platform generates a single transaction and invoice whether the selected items are purchased from in-network or third-party vendors.

26 Claims, 5 Drawing Sheets

(56) References Cited

U.S. PATENT DOCUMENTS

| | | |
|---|---|---|
| 2009/0240735 A1 | 9/2009 | Grandhi et al. |
| 2010/0010906 A1* | 1/2010 | Grecia .................. G06Q 20/102 705/21 |
| 2012/0123877 A1 | 5/2012 | Buick et al. |
| 2013/0132236 A1* | 5/2013 | Gokturk ............ G06F 17/30256 705/26.61 |
| 2013/0138516 A1 | 5/2013 | White |
| 2013/0173465 A1 | 7/2013 | Talimaa et al. |
| 2014/0100983 A1 | 4/2014 | Cavagnaro |
| 2014/0172643 A1 | 6/2014 | Fazl Ersi et al. |
| 2014/0351072 A1 | 11/2014 | Wieler et al. |
| 2015/0026037 A1 | 1/2015 | Thompson et al. |

* cited by examiner

SYSTEM AND METHOD FOR MANAGEMENT AND AUTOMATION OF INSTANT PURCHASE TRANSACTIONS

CROSS-REFERENCE TO RELATED APPLICATIONS

This application claims priority under 35 U.S.C. § 119(e) to provisional U.S. Patent Application Ser. No. 62/136,172, filed on Mar. 20, 2015, and Ser. No. 62/136,205, filed on Mar. 20, 2015. Said provisional U.S. Patent Applications 62/136,172 and 62/136,205 are herein incorporated by reference in their entirety.

BACKGROUND

Current systems for web-based purchasing or mobile purchasing (e.g., via an internet-enabled smartphone or similar mobile device) incorporate an Application Programming Interface (API) to manage the exchange of information between a broad variety of client-side and merchant-side systems. APIs may be created by the parties involved in the transactions, and may to some extent be standardized, as within a network of participating vendors affiliated with each other and with a client-side platform. If, for example, the user of a mobile device wishes to purchase multiple items from multiple third-party vendors outside a vendor network, the simultaneous invocation of multiple diverse APIs by a mobile application may slow or disrupt other activity on the mobile device. It may therefore be desirable for a mobile purchase system to simultaneously manage multiple purchases, from participating and third-party vendors, in real time without disrupting the experience of the end user.

SUMMARY

Embodiments of the inventive concepts disclosed herein are directed to a system for completing instant online transactions involving the combined purchases of items from in-network and third-party retailers. In a first aspect, embodiments of the inventive concepts disclosed herein are directed to a system including a mobile device including a memory for securely storing payment details of the user of the mobile device. The system may include a client-side e-commerce platform executing on the mobile device and associated with a network of affiliated vendors. The client-side platform may acquire images captured by, or stored in, the mobile device, and identify candidate items for purchase based on the acquired images. The client-side platform may allow the user to select candidate items for purchase, whether the items are offered by affiliated vendors of the vendor network or by third-party retailers not affiliated with the vendor network. The client-side platform may retrieve purchase information (e.g., availability, inventory, shipping details, applicable taxes) for the in-network items by calling Application Program Interfaces (APIs) associated with the vendor network, and determine purchase information for items offered by third-party retailers by calling automated middleware to connect the client-side platform with merchant-side e-commerce platforms of the third-party vendors. The client-side platform may generate transactions corresponding to the combined purchase of in-network and third-party items based on the retrieved purchase information. The client-side platform may retrieve authorization codes and other transaction records associated with the completed purchase of the in-network items via the network APIs. The automated middleware may retrieve authorization codes and other transaction records associated with the completed purchase of the third-party items from the merchant-side platforms of the third-party vendors, and forward the retrieved purchase records to the client-side platform.

In a further aspect, embodiments of the inventive concepts disclosed herein are directed to a related method for completing instant online transactions involving the combined purchases of items from in-network and third-party retailers based on images of desired products or items. The method may include acquiring an image via a client-side e-commerce platform executing on a mobile device, the mobile device including a memory for storing payment details and security details associated with the user of the mobile device. The client-side platform may be associated with vendor networks of affiliated vendors. The method may include identifying candidate items based on the acquired images via the client-side platform. The method may include selecting items for purchase from the candidate items via the client-side platform, the items for purchase offered by affiliated vendors of the vendor network as well as third-party vendors not affiliated with the vendor network. The method may include retrieving, via the client-side platform, purchase information associated with items offered by the affiliated vendors by calling APIs associated with the vendor network or with affiliated vendors. The method may include retrieving, via the client-side platform, purchase information associated with items offered by third-party vendors by calling middleware platforms to connect the client-side platform with merchant-side e-commerce platforms of the third-party vendors. The method may include generating a transaction via the client-side platform, the transaction corresponding to the combined purchase of the selected in-network and third-party items, based on the retrieved purchase information and the user's payment details. The method may include providing the payment details of the user from the client-side platform to the in-network vendors via the vendor network APIs. The method may include providing the payment details of the user from the client-side platform to the merchant-side platforms via the middleware platforms. The method may include retrieving, via the client-side platform, authorization codes and other transaction records associated with the purchase of the in-network items via the network APIs. The method may include retrieving, via the middleware platforms, authorization codes and transaction records associated with the purchase of the third-party items and forwarding the retrieved records to the client-side platform. The method may include generating, via the client-side platform, a single invoice corresponding to the purchase of the in-network and third-party items based on the retrieved transaction records.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
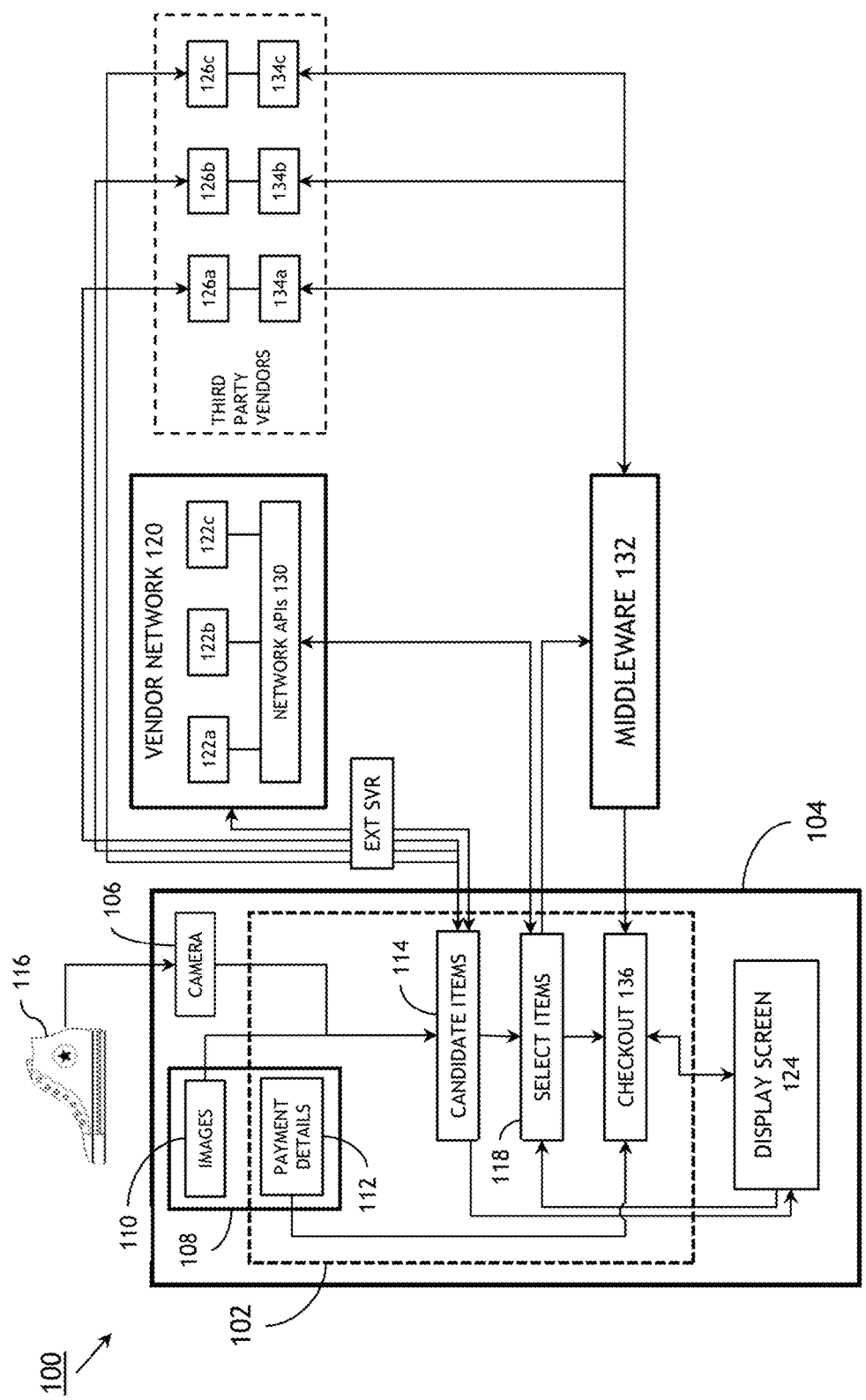
FIG. 1 is a block diagram of an exemplary embodiment of a system 100 according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for managing and completing instant online transactions via a smartphone or similar mobile device. The transactions may involve the concurrent purchase of items from in-network, or affiliated, vendors as well as from third-party unaffiliated vendors. The user provides the system with an image of a desired item; based on attributes of the image, the system returns candidate items approximating the desired item. From the perspective of the mobile end user, the candidate items are presented in a consistent and uniform fashion, and may be purchased via single-click checkout without disrupting the end user's utilization of the mobile device regardless of the offering vendor (i.e., in-network or third-party). Upon checkout, the user may receive a single invoice for a single transaction incorporating multiple purchases from multiple vendors.

Referring to FIG. 1, a system 100 for completing instant online transactions may include a client-side e-commerce platform 102 configured to execute on one or more processors of a smartphone or similar mobile device 104. The mobile device 104 may include an onboard camera 106 and memory 108 which the client-side platform 102 may access and control, e.g., the end user may capture images via the onboard camera 106 from within the client-side platform 102. The memory 108 may store images 110 previously captured by the onboard camera 106 or otherwise stored to the mobile device 102 (e.g., downloaded by the end user) as well as payment details 112 entered by the end user via an initialization process when the client-side platform 102 is installed on the mobile device 104. For example, the client-side platform 102 may ask the end user for his/her name, shipping address, credit/debit card information, bank/payment service account information, and any other relevant information necessary for the client-side platform 102 to complete a transaction, securely storing the information to the memory 108. Payment details 112 stored in the memory 108 may include security details for verifying the identity of the end user, or if additional measures of security are desired. For example, the end user may store a password, pass phrase, personal identification number (PIN), or encryption key to memory 108. A security detail stored in the memory 108 may incorporate biometric data, such as a recorded fingerprint, eyeprint, or retinal scan.

Figure 2A:
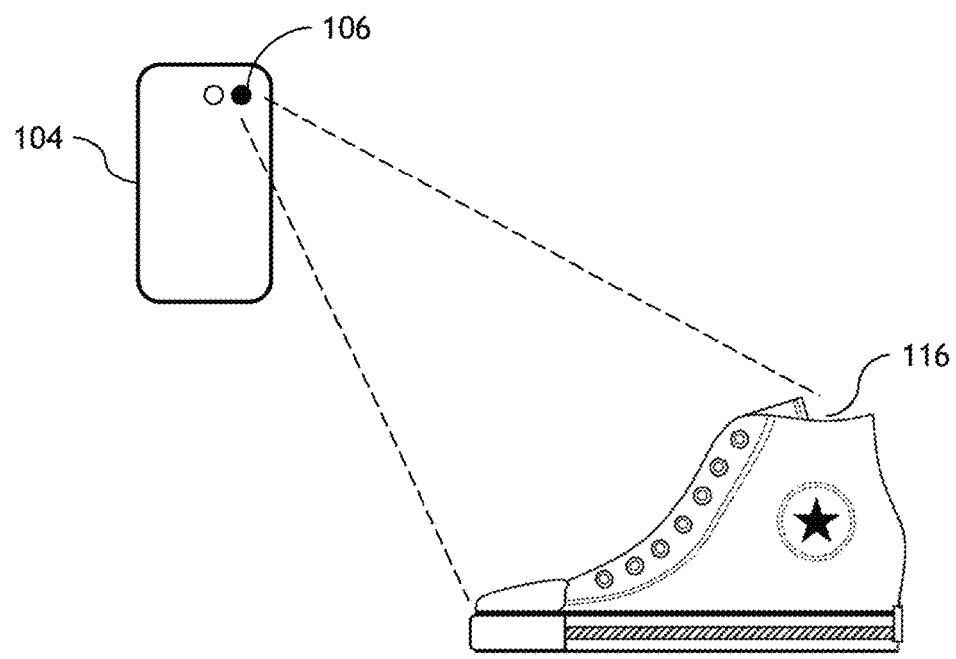
FIGS. 2A-2D illustrate operations of the system of FIG. 1 according to the inventive concepts disclosed herein.

The end user may activate the client-side platform 102 via the mobile device 104 when the end user wishes to purchase one or more desired items 116, e.g., articles of clothing or other consumer goods, such as a pair of white leather Converse high-top basketball shoes. The client-side platform 102 may search product catalogues and other online sources to identify candidate items (114) based on images captured by, or selected by, the end user via the client-side platform. For example, referring also to FIGS. 2A and 2B, the end user may photograph the desired item 116 through the client-side platform 102, which accesses the onboard camera 106 to capture the image 138. The end user may photograph a circular, advertisement, magazine, or other prefabricated image portraying the desired item 116. The end user may also select, via the client-side platform 102, a previously captured or downloaded image 138 from a photo library and stored to the memory 108 of the mobile device 104. Based on an analysis of the captured image, the client-side platform 102 may determine attributes 140 of the desired item (e.g., attributes of an item of clothing may include color, material, gender, and other item categorizations such as shoes, belts, jackets, etc.). For example, the client-side platform may determine that the captured image 138 depicts a "white Converse hightop leather shoe". The quality of an image 138 submitted to the client-side platform 102*a* may determine the accuracy of the attributes 140 based on the image. For example, if a high quality image 138 is captured by the onboard camera 106, the client-side platform may determine with sufficient confidence that the desired item 116 is a 1) hightop basketball shoe; 2) a Converse-branded basketball shoe (or perhaps an even more specific make of shoe, e.g., Converse Chuck Taylor); 3) a white shoe, as opposed to gray, beige, or some other color; 4) a leather shoe, as opposed to a canvas shoe; and 5) a men's shoe, as opposed to a women's or unisex shoe. If the submitted image is of lower quality, e.g., a monochrome image or a low-resolution image, fewer attributes 140 may be determined with confidence; the client-side platform 102 may determine only that the desired item is a "white hightop shoe". The client-side platform 102 may reference knowledge bases stored on external servers or human assistance in identifying item attributes 140 from an image 138. The client-side platform 102 may determine image attributes 140 based on analysis of the image 138, e.g., colors, tints, hues, saturation and brightness levels, or pixel patterns, and identify candidate items 116 by attempting to identify catalogued or online images with similar properties to the captured image 138.

Figure 2B:
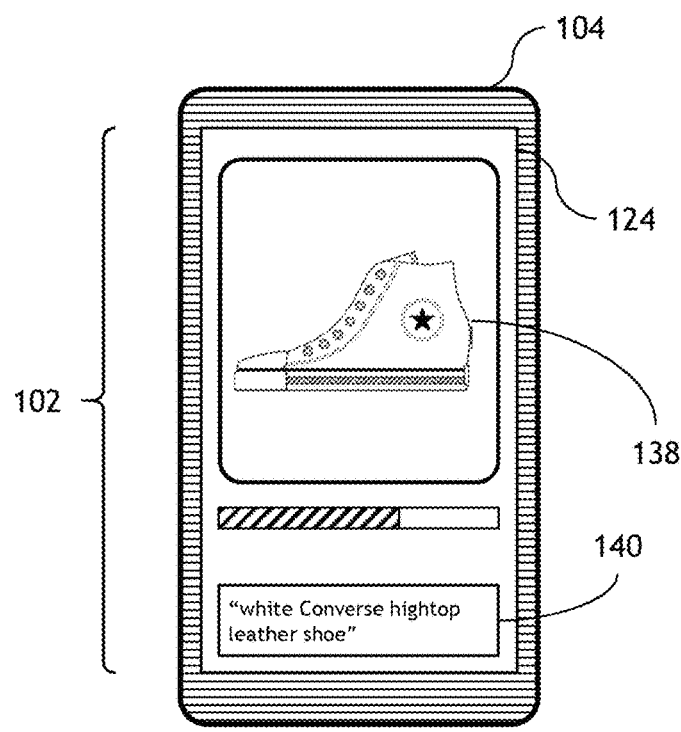

Once item attributes 140 based on a captured image 138 have been identified, the client-side platform 102 may search for candidate items 114 matching the determined item attributes 140 through a variety of online catalogues or product indices. If the client-side platform 102 is affiliated with a vendor network 120 of participating vendors 122*a-c*, the client-side platform may search catalogues organized by the vendor network 120 or by individual in-network vendors 122*a-c*. The client-side platform 102 may provide single-click access (e.g., through tapping a touch-sensitive display screen 124 of the mobile device 104) to additional product offers, coupons, or sales associated with the vendor network 120 or with individual in-network vendors 122*a-c*. The client-side platform 102 may order and display identified candidate items 114 based on the relevance or similarity of a candidate item to the desired item 116 or to the corresponding attributes 140 of the desired item. For example, referring particularly to FIG. 2C, the client-side platform 102 may return twenty-four candidate items 114 corresponding to the determined attributes 140 as shown in FIG. 2B ("white Converse hightop leather shoe") and display the candidate items on the display screen 124 of the mobile device 104. A candidate item 114*a* may be prominently displayed if the attributes of the candidate item match the attributes 140 of the desired item 116 exactly or nearly exactly. For example, the candidate item 114*a* may be a pair of white leather Converse hightop shoes and thus match exactly the desired attributes 140. The client-side platform 102 may retrieve and display catalogued information such as the price 142 of the candidate item 114*a* or the vendor 122 offering the candidate item (here, vendor XYZ is an in-network vendor 122 affiliated with a vendor network (120, FIG. 1) with which the client-side platform 102 is affiliated). A second candidate item 114*b*, also offered by the vendor XYZ (122), may be prominently displayed by the client-side platform 102 although the candidate item 114*b* may not as closely match the desired attributes 140 (e.g., candidate item 114*b* may be a pair of black canvas Converse hightop shoes). Similarly, candidate items 114*c* (a pair of white canvas lowtop shoes which may or may not be Converse-branded) and 114*d* (a pair of white leather Nike hightop shoes) may be less prominently displayed. The less relevant candidate items 114*c* and 114*d* may be offered by a third-party vendor ABC (126), which is not affiliated with the vendor network 120.

Figure 2D:
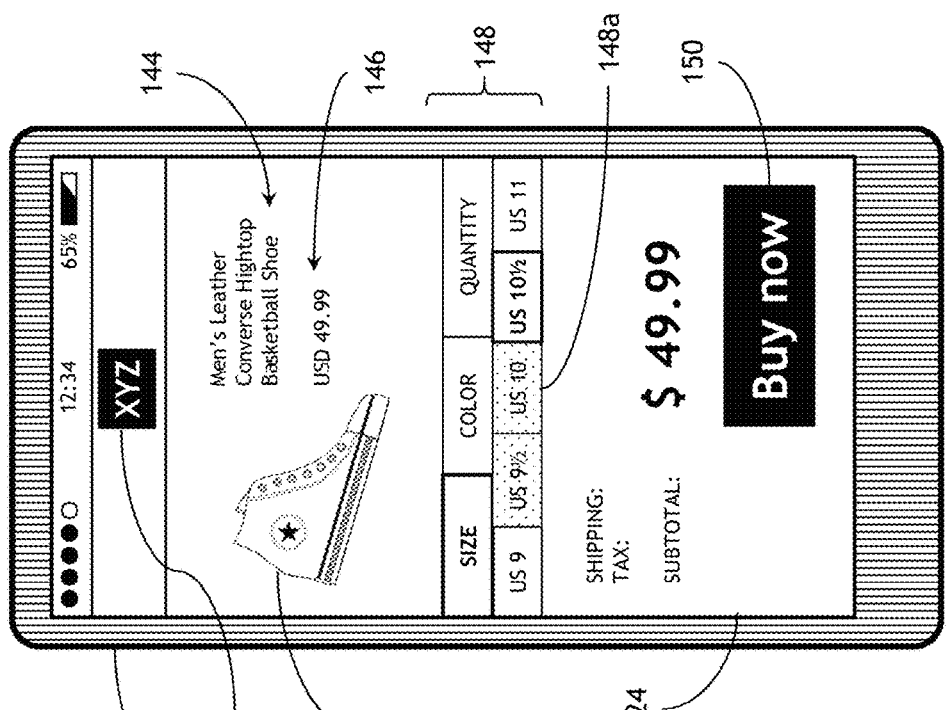
Figure 2C:
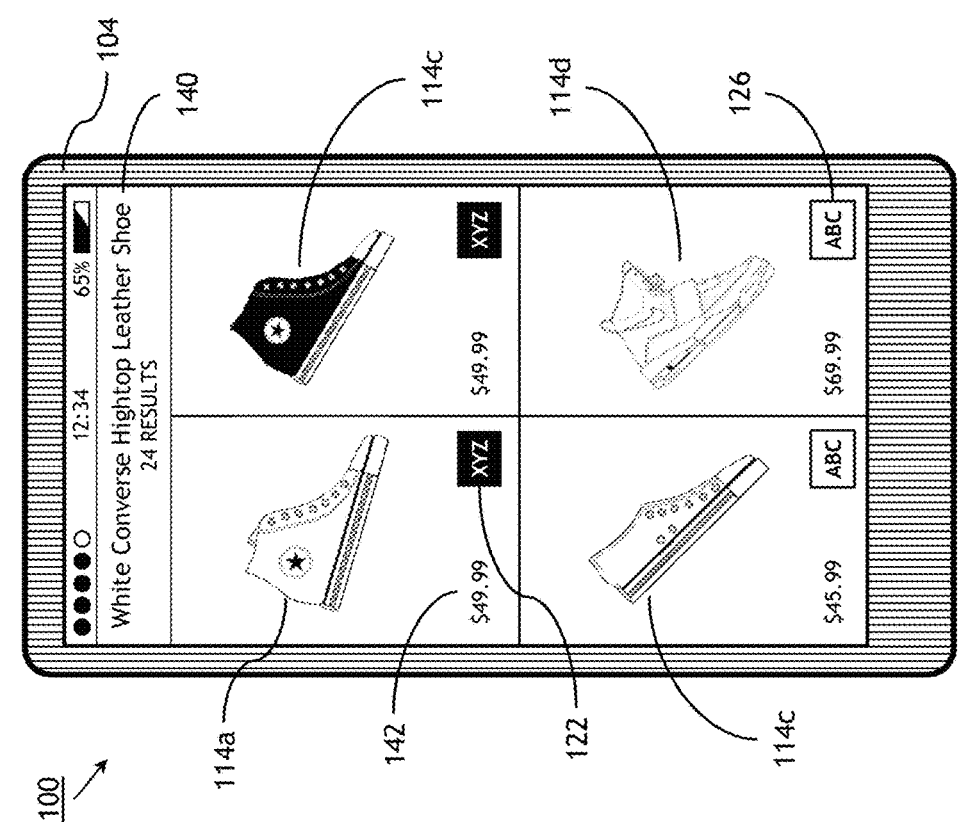

Referring also to FIG. 2D, the user may select one or more displayed candidate items 114*a-d* for purchase. For example, the user may click, tap, or otherwise contact the portion of the display screen 124 corresponding to the candidate item 114*a*, selecting that candidate item for purchase. If the selected item 118 is offered by an in-network vendor 122 (in this case, the in-network vendor XYZ), the client-side platform 102 may call network APIs 130 (FIG. 1) provided by the in-network vendor 122 (or by the vendor network 120 with which XYZ is affiliated) to retrieve current pricing and inventory information such as the item description 144 of the selected item 118 as well as the current price 146. The client-side platform 102 may call network APIs 130 to retrieve any shipping details or tax rates applicable to the purchase of the selected item 118, and allow the end user to select a desired size, color, quantity or other classification of the selected item 118 based on available inventory 148 determined by the network APIs 130 (e.g., one pair, US size 10½). The available inventory section 148 may indicate (148*a*) whether particular sizes, styles, or colors of a selected item 118 are out of stock or otherwise unavailable, e.g., US sizes 9½ and 10). Once the end user has finalized inventory details associated with the purchase of a selected item 118, the end user may add the selected item 118 to a transaction generated by the client-side platform 102, e.g., by clicking or tapping on a designated portion 150 (e.g., a button marked "buy now") of the display screen 124 of the mobile device 104. The end user may complete a generated transaction for the purchase of multiple selected items 118 via single-click checkout (136) or security challenge, depending on the desired level of security. For example, the client-side platform 102 may display a list of selected items 118 added to the transaction along with the price 146 of each item (including any applicable taxes and shipping costs); the end user may continue shopping, remove a selected item 118 from the transaction, or complete the transaction, purchasing the group of selected items 118, by tapping or clicking a designated "checkout" section of the display screen 124. The client-side platform 102 may (e.g., if the end user has previously requested such measures) require the end user to verify a security detail (securely stored with the end user's payment details 112 in the memory 108 of the mobile device 104) before completing a transaction. For example, the end user may be required to enter, confirm, or verify a password, pass phrase, PIN, encryption key, or a biometric detail such as a fingerprint or eyeprint.

Referring back to FIG. 1, once the end user has selected a pool of selected items 118 for purchase and checked out of the transaction, the client-side platform 102 may retrieve any information necessary for the purchase of each selected item 118. In the case of items to be purchased from in-network vendors 122*a-c*, the client-side platform 102 may call the network APIs 130, providing any required payment details 112 to the in-network vendors 112*a-c* so that the purchase of each individual selected item 118 of a transaction may be completed on the merchant side by the APIs. The client-side platform 102 may retrieve from the APIs 130 any shipping arrangements, applicable taxes, item availability details (e.g., in-stock colors, sizes, etc.) relevant to the purchase of selected items 118 from the in-network vendors 122a-c. With respect to selected items 118 offered by third-party vendors 126a-c, the client-side platform 102 may invoke an automated middleware platform 132 to connect the client-side platform to merchant-side e-commerce platforms 134a-c of the third-party vendors 126a-c. The middleware platform 132 may retrieve any current pricing, availability, shipping, and other purchase information necessary to finalize the purchase of selected items 118 from the third-party vendors 126a-c, providing the retrieved purchase information to the client-side platform 102.

When any necessary purchase information has been retrieved, the client-side platform 102 may prompt the end user to complete the transaction (i.e., checkout) by displaying to the end user a generated transaction (136) for the purchase of all available selected items 118, which transaction the end user may complete via interaction with the display screen 124 of the mobile device 104. For example, the client-side platform 102 may display a generated transaction 136 listing all selected items 118 to be purchased, the specific vendors from which each item will be purchased (including in-network vendors 122a-c and third-party vendors 126a-c), and the accurate and current sale price for each selected item 118; the end user may complete the transaction by clicking or tapping a specific portion of the screen, e.g., a prominently marked "buy now" button. When the end user completes the transaction, the client-side platform 102 may provide the relevant in-network vendors 122a-c with the end user's payment details 112, and retrieve any authorization codes, payment confirmations, or other records of the transaction, from the in-network vendors 122a-c via the network APIs 130. Similarly, the middleware platform 132 may retrieve user payment details 112 from the client-side platform 102 and forward any required payment details to the merchant-side platforms 134a-c of the relevant third-party vendors 126a-c so that any transactions for purchase of selected items 118 from the third-party vendors may be completed by the third party vendors. The middleware platform 132 may retrieve any resulting authorization codes, payment confirmations, tracking numbers, or other transaction records from the relevant merchant-side platforms 134a-c and forward the retrieved information to the client-side platform 102. The client-side platform 102 may generate for the end user an invoice of the transaction, which may be displayed via the display screen 124 of the mobile device 104; the generated invoice may include the retrieved authorization codes and other transaction records.

Figure 3A:
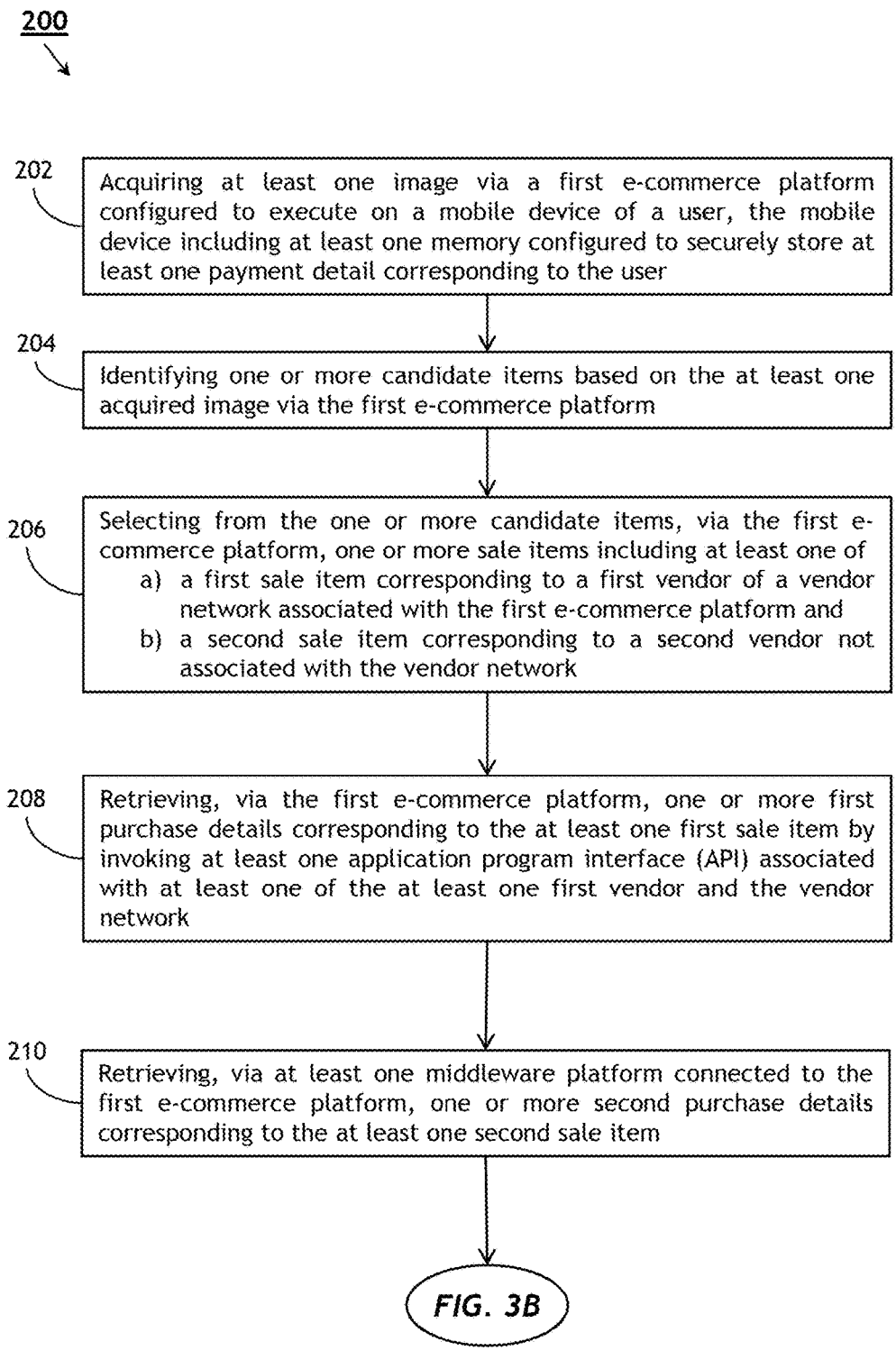
FIGS. 3A-3B are process flow diagrams illustrating a method according to the inventive concepts disclosed herein.
Figure 3B:
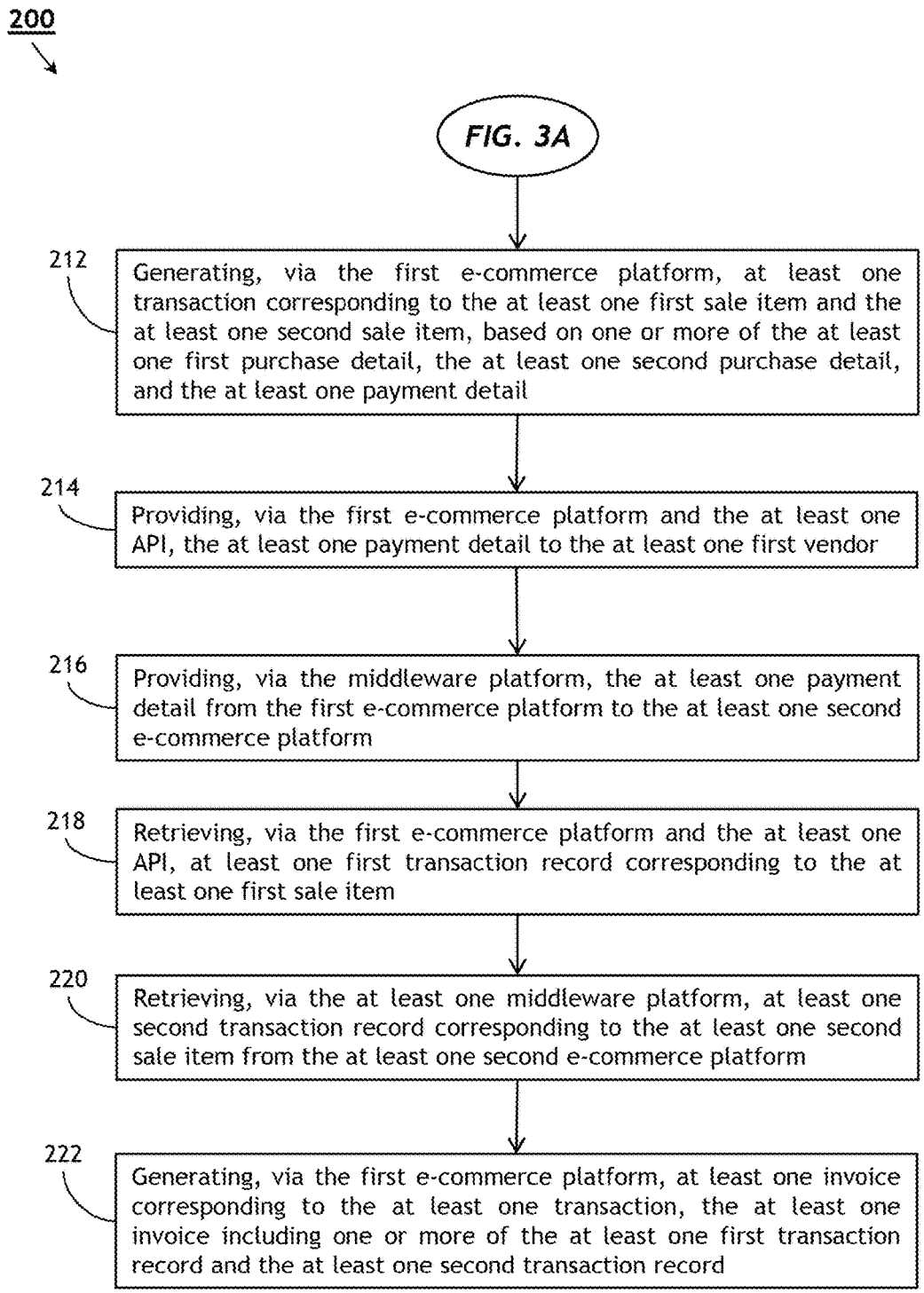

Referring to FIGS. 3A and 3B, an exemplary embodiment of a method 200 for completing instant online transactions with multiple vendors using a mobile device 104 may include the following steps. At a step 202, the client-side e-commerce platform 102 executable on the mobile device 104 acquires images related to a desired item 116. For example, the client-side platform 102 may acquire images via an onboard camera 106 of the mobile device 102. The client-side platform 102 may acquire images stored to a memory 108 of the mobile device 104.

At a step 204, the client-side platform 102 identifies one or more candidate items 114 (offered by in-network vendors 122a-c or third-party vendors 126a-c) based on the acquired images.

At a step 206, the client-side platform 102 selects items for purchase (selected items 118) from the candidate items 114, including items offered by in-network vendors 122a-c of a vendor network 120 associated with the client-side platform and items offered by third-party vendors 126a-c.

At a step 208, the client-side platform 102 retrieves purchase information (e.g., item descriptions, offering vendors, list prices) associated with the purchase of selected items 118 offered by in-network vendors 122a-c or a vendor network 120 by invoking Application Programming Interfaces (API) 130 associated with the vendor network or with the in-network vendors.

At a step 210, the client-side platform 102 retrieves purchase information associated with the purchase of selected items 118 offered by third-party vendors 126a-c by invoking middleware platforms 132 connecting the client-side platform 102 to merchant-side e-commerce platforms 134a-c of the third-party vendors. For example, the middleware platform 132 may retrieve the purchase information from the merchant-side platforms 134a-c, forwarding the retrieved information to the client-side platform 102.

Referring to FIG. 3B, at a step 212, the client-side platform 102 generates a transaction (checkout, 136) corresponding to the purchase of the selected items 118, based on the purchase information related to the purchase of selected items from in-network vendors 122a-c, the purchase information related to the purchase of selected items from third-party vendors 126a-c, and the payment details 112 of the end user. For example, the generated transaction may include an interaction of the end user with the mobile device 104 to complete the transaction (i.e., checkout process). The interaction may be a click, tap, or other contact by the end user on the touch-enabled display screen 124 of the mobile device 104 (e.g., on a designated "buy now" button displayed on the screen), or a verification by the end user of a security detail, such as a password, pass phrase, PIN, biometric detail, or other payment detail 112 securely stored in the memory 108 of the mobile device 104.

At a step 214, the client-side platform 102 provides the payment details 112 of the end user to the in-network vendors 122a-c via the network APIs 130 for execution of the completed transaction.

At a step 216, the middleware platforms 132 provide the payment details 112 of the end user from the client-side platform 102 to the third-party vendors 126a-c. For example, the middleware platforms 132 may provide user payment details 112 to the merchant-side platforms 134a-c of the third-party vendors 126a-c.

At a step 218, the client-side platform 102 retrieves authorization codes, purchase confirmations, and other transaction records related to the purchase of the selected items 118 from in-network vendors 122a-c via the network APIs 130.

At a step 220, the middleware platforms 132 retrieve authorization codes, purchase confirmations, and other transaction records related to the purchase of the selected items 118 from third-party vendors 126a-c. For example, the middleware platform 132 may retrieve the purchase records from the merchant-side platforms 134a-c of the third-party vendors 1226a-c and forward the retrieved purchase records to the client-side platform 102.

At a step 222, the client-side platform 102 generates an invoice of the completed and executed transaction 136, including the transaction records retrieved by the network APIs 130 from in-network vendors 122a-c and the transaction records retrieved by the middleware platform 132 from the merchant-side platforms 134a-c of the third-party vendors 126a-c.

As will be appreciated from the above, systems and methods according to embodiments of the inventive concepts disclosed herein may enable the online purchase via mobile device of multiple items based on images of the desired items in real time, without disrupting any mobile activity on the part of the end user. The end user need not have prior knowledge of where a desired product or item is sold locally, or even the details of its manufacture. The end user may locate and select items for purchase from both participating/in-network vendors as well as third-party vendors, viewing a single transaction completable by a single click and receiving a single invoice of the transaction regardless of the vendors from which each item is purchased.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A tangible, non-transitory, machine-readable medium storing instructions that when executed by one or more processors of a mobile device effectuate operations comprising:
   instantiate a first e-commerce platform configured to execute on at least one processor of a mobile device, wherein memory of the mobile device is configured to securely store at least one payment detail corresponding to an end user, the first e-commerce platform being associated with a vendor network including a first vendor, and the first e-commerce platform being configured to:
   acquire at least one image of an item via the mobile device;
   determine two or more candidate items based on the at least one image;
   select, from the two or more candidate items, at least a first sale item purchasable from the first vendor and a second sale item purchasable from a second vendor external to the vendor network;
   determine one or more first purchase details associated with the first sale item via at least one Application Program Interface (API), the at least one API being associated with the first vendor, the vendor network, or the first vendor and the vendor network;
   determine one or more second purchase details associated with the second sale item via a middleware platform invoked by the first e-commerce platform, the middleware platform being configured to connect the first e-commerce platform to a second e-commerce platform associated with the second vendor;
   cause at least one transaction corresponding to a purchase of the first sale item and the second sale item to be generated based on at least one of: the one or more first purchase details, the one or more second purchase details, or the at least one payment detail;
   provide the at least one payment detail to the first vendor via the at least one API; and
   retrieve at least one first transaction record corresponding to the purchase via the at least one API; and
   the middleware platform is communicatively coupled to the first e-commerce platform and is configured to:
   retrieve the one or more second purchase details from the second e-commerce platform;
   provide the at least one payment detail to the second e-commerce platform;
   retrieve, from the second e-commerce platform, at least one second transaction record corresponding to the purchase; and
   forward the at least one second transaction record to the first e-commerce platform.

2. The medium of claim 1, wherein:
   the mobile device includes at least one camera configured to capture the at least one image;
   the two or more candidate items are selected based on attributes of the item; and
   the attributes of the item are determined on the mobile device with the first e-commerce platform based on the image.

3. The medium of claim 1, wherein the at least one payment detail includes at least one of: a user identity, an address, an account number, a method of payment, or a security detail.

4. The medium of claim 3, wherein the at least one security detail includes at least one of: a password, a personal identification number (PIN), or a biometric detail.

5. The medium of claim 1, wherein the first e-commerce platform is configured to cause the at least one transaction to be generated based on an interaction of the end user with the mobile device, wherein the interaction comprises:
   contact of the end user detected by at least one display unit associated with the mobile device;
   verification of the at least one payment detail by the mobile device; or
   the contact and the verification.

6. The medium of claim 1, wherein the one or more first purchase details and the one or more second purchase details include at least one of: a vendor identity, an availability, a price, a tax, a shipping cost, a color, a size, a dimension, a quantity, or a material associated with the one or more candidate items.

7. The medium of claim 1, wherein the first e-commerce platform is configured to:
   cause at least one invoice associated with the at least one transaction to be generated, the at least one invoice including the at least one first transaction record and the at least one second transaction record.

8. The system of claim 1, wherein the at least one first transaction record and the at least one second transaction record each include an authorization code, a purchase confirmation, or the authorization code and the purchase confirmation.

9. A method for completing instant online transactions via a mobile device, comprising:
   acquiring at least one image of at least one item purchasable via a first e-commerce platform, wherein:
   the first e-commerce platform is configured to execute on at least one processor of a mobile device associated with an end user, the mobile device including memory configured to securely store at least one payment detail corresponding to the user, and the first e-commerce platform being associated with a first vendor of a vendor network;

determining two or more candidate items based on attributes of each of the at least one item included within the at least one image via the first e-commerce platform;

selecting, from the two or more candidate items and via the first e-commerce platform, at least a first sale item purchasable from the first vendor and a second sale item purchasable from a second vendor external to the vendor network;

retrieving, via the first e-commerce platform, one or more first purchase details associated with the first sale item via at least one Application Program Interface (API), the at least one API being associated with the first vendor, the vendor network, or the first vendor and the vendor network;

retrieving, via a middleware platform invoked by the first e-commerce platform, the middleware platform being configured to connect the first e-commerce platform to a second e-commerce platform associated with the second vendor, one or more second purchase details associated with the second sale item;

causing, via the first e-commerce platform, at least one transaction corresponding to a purchase of the first sale item and the second sale item to be generated based on at least one of: the one or more first purchase details, the one or more second purchase details, or the at least one payment detail;

providing, via the first e-commerce platform and the at least one API, the at least one payment detail to the first vendor;

providing, via the middleware platform, the at least one payment detail from the first e-commerce platform to the second vendor;

retrieving, via the first e-commerce platform and the at least one API, at least one first transaction record corresponding to the purchase;

retrieving, via the middleware platform, at least one second transaction record corresponding to the purchase; and causing, via the first e-commerce platform, at least one invoice associated with the at least one transaction to be generated, the at least one invoice including the at least one first transaction record and the at least one second transaction record.

10. The method of claim 9, wherein acquiring the at least one image comprises:
activating a camera of the mobile device, wherein:
the at least one image is acquired via the camera; and
the attributes of the at least one item are determined on the mobile device with the first e-commerce platform based on the image.

11. The method of claim 9, wherein acquiring the at least one image comprises:
acquiring the at least one image from the memory of the mobile device, wherein the at least one image was previously obtained and stored in the memory.

12. The method of claim 9, wherein causing, via the first e-commerce platform, the at least one transaction to be generated comprises:
causing, via the first e-commerce platform, the at least one transaction to be generated based on:

a) one or more of: the one or more first purchase details, the one or more second purchase details, or the at least one payment detail;
b) at least one interaction of the end user detected by the mobile device; or
c) both a) and b).

13. The method of claim 12, wherein the at least one interaction comprises:
contact by the end user with a display unit associated with the mobile device,
verification of the at least one payment detail via the mobile device, or
the contact and the verification.

14. The method of claim 9, wherein the one or more second purchase details retrieved from the second e-commerce platform are obtained from the second vendor, the method further comprising:
forwarding, via the middleware platform, the one or more second purchase details to the first e-commerce platform.

15. The method of claim 14, wherein providing, via the middleware platform, the at least one payment detail from the first e-commerce platform to the second vendor comprises:
providing, via the middleware platform, the at least one payment detail from the first e-commerce platform to the second e-commerce platform.

16. The method of claim 14, wherein the at least one second transaction record is retrieved from the second e-commerce platform, the method further comprises:
forwarding, via the middleware platform, the at least one second transaction record to the first e-commerce platform.

17. The method of claim 9, wherein:
retrieving, via the first e-commerce platform and the at least one API, the at least one first transaction record comprises retrieving, via the first e-commerce platform, at least one of: a first authorization code, a first purchase confirmation, or the first authorization code and the first purchase confirmation from the first vendor via the at least one API; and
retrieving, via the middleware platform, the at least one second transaction record comprises retrieving, via the middleware platform, at least one of: a second authorization code, a second purchase confirmation, or the second authorization code and the second purchase confirmation from the second e-commerce platform.

18. The method of claim 9, wherein determining the one or more candidate items based on the at least one image comprises:
analyzing the at least one image to determine one or more attributes of the at least one item within the at least one image; and
determining, from a plurality of candidate items, the two or more candidate items based on a determination of similarity of the one or more attributes of the item and one or more attributes associated with each of the two or more candidate items.

19. The method of claim 9, wherein:
providing the at least one payment detail to the first vendor comprises the first e-commerce platform calling the at least one API to provide the at least one payment detail to the first vendor so that the purchase of the first sale item is completed by the at least one API; and
providing the at least one payment detail to the second vendor comprises the middleware platform forwarding the at least one payment detail to the second e-commerce platform so that the purchase of the second sale item is completed by the second vendor.

20. One or more tangible, non-transitory, computer-readable media storing instructions that when executed by one or more processors are capable of effectuating operations comprising:

obtaining, by a mobile device, an image;

determining, by and on one or more processors, a plurality of attributes of an object depicted in the image, the plurality of attributes including a color of the object, a type of the object, and a sub-type of the object;

sending, from the mobile device, a search request to a remote e-commerce platform for a responsive set of candidate items, wherein:

the search request requests candidate items that are determined to have attributes similar to the plurality of attributes of the object, the search request causes a first subset of responsive candidate items to be selected from a first set of items obtained from a first vendor's online product-listings via a first application-program interface (API) connection, and the search request causes a second subset of responsive candidate items to be selected from a second set of items obtained from a second vendor's online product-listings via a second API connection, the second vendor's online product-listing being different from the first vendor's online product listing, and the first API connection being different from the second API connection;

receiving, with the mobile device, the first subset of responsive candidate items and the second subset of responsive candidate items; and presenting, with the mobile device, descriptions of the first subset of responsive candidate items and descriptions of the second subset of responsive candidate items in a user interface.

21. The one or more media of claim 20, wherein:
the image is captured with a camera of the mobile device; the object is a shoe;
the type is shoe;
the sub-type indicates whether the shoe is a hightop;
the plurality of attributes include a material of the shoe;
the plurality of attributes include a brand of the shoe;
the responsive set of candidate items includes a responsive shoe that matches at least three of the plurality of attributes; and
the responsive set of candidate items includes a responsive shoe that does not match at least one of the plurality of attributes.

22. The one or more media of claim 20, wherein:
the plurality of attributes of the object depicted in the image are determined by the mobile device before sending the search request.

23. The one or more media of claim 20, wherein:
the operations comprise steps for completing instant online transactions with multiple vendors using the mobile device.

24. The one or more media of claim 20, wherein:
presenting descriptions of the first subset of responsive candidate items and descriptions of the second subset of responsive candidate items in the user interface comprises steps for causing candidate items to be displayed on a display screen of the mobile device.

25. The one or more media of claim 20, wherein:
the first vendor is part of a group of vendors in a remotely hosted vendor network, wherein the vendor network is configured to affiliate a platform executing at least in part on the mobile device with members of the group of vendors; and
the second vendor is not part of the group of vendors in the vendor network.

26. The one or more media of claim 20, wherein:
determining the plurality of attributes of the objected depicted in the image is performed by a system having the one or more processors and in communication with the mobile device.

* * * * *